(12) United States Patent
Serizawa et al.

(10) Patent No.: US 6,251,208 B1
(45) Date of Patent: Jun. 26, 2001

(54) METHOD FOR MANUFACTURING A STRUCTURE WITH FINE RIBS

(75) Inventors: Shogo Serizawa; Haruji Hosoi, both of Shizouka-ken; Hiromi Nakamura; Yutaka Hasegawa, both of Numazu, all of (JP)

(73) Assignee: Toshiba Machine Co., Ltd., Tokyo (JP)

( * ) Notice: Subject to any disclaimer, the term of this patent is extended or adjusted under 35 U.S.C. 154(b) by 0 days.

(21) Appl. No.: 08/960,230

(22) Filed: Oct. 29, 1997

(30) Foreign Application Priority Data

Oct. 29, 1996 (JP) .................................... 8-286589
Jun. 11, 1997 (JP) .................................... 9-153511
Jul. 23, 1997 (JP) .................................... 9-197083

(51) Int. Cl.$^7$ ........................... B32B 31/04; B32B 31/20; C03B 19/09; H01J 9/00
(52) U.S. Cl. ........................... 156/232; 65/17.3; 156/235; 445/24
(58) Field of Search ................................ 156/230, 231, 156/232, 234, 235; 445/24; 65/23, 17.3, 60.8; 118/212

(56) References Cited

U.S. PATENT DOCUMENTS

| | | | | |
|---|---|---|---|---|
| 1,503,665 | * | 8/1924 | Roberts ........................ | 118/212 X |
| 2,206,686 | * | 7/1940 | Bauman ........................ | 118/212 X |
| 2,531,036 | * | 11/1950 | Goettsch ...................... | 118/212 |
| 2,752,881 | * | 7/1956 | Feindel ........................ | 118/212 X |
| 3,360,393 | * | 12/1967 | Rhorer ........................ | 118/212 X |
| 4,479,432 | * | 10/1984 | Masaki et al. ................ | 101/170 |
| 5,221,979 | * | 6/1993 | Kim ............................. | 359/54 |
| 5,635,006 | * | 6/1997 | Watanabe et al. ............ | 156/240 |
| 5,810,634 | * | 9/1998 | Miyazaki et al. ............. | 445/24 X |
| 5,853,446 | * | 12/1998 | Carre et al. .................. | 65/17.3 |

FOREIGN PATENT DOCUMENTS

| | | | | |
|---|---|---|---|---|
| 53-28373 | * | 3/1978 | (JP) ........................... | 445/24 |
| 1-137534 | * | 5/1989 | (JP) ........................... | 445/24 |

* cited by examiner

Primary Examiner—Adrienne C. Johnstone
(74) Attorney, Agent, or Firm—Pillsbury Winthrop LLP (57) ABSTRACT

A structure having fine ribs with a high dimensional precision is used as the rear panel of a plasma display or as a micro organism carrier for use in a chemical device. The present invention aims to provide a method for manufacturing such a structure at low cost. According to the invention, a composite sheet comprises a surface layer of silicone rubber and a base layer of a steel sheet. Grooves are formed in the surface layer, and filled with a paste material. The paste material is cured to form ribs. After a substrate is placed on the surface layer of the composite sheet, the composite sheet is pressed against the substrate from the base layer side, thereby compressing the ribs and adhering them to the substrate. Thereafter, the ribs and the substrate are removed from the composite sheet. As a result, a structure with fine ribs is obtained.

10 Claims, 9 Drawing Sheets

METHOD FOR MANUFACTURING A STRUCTURE WITH FINE RIBS

BACKGROUND OF THE INVENTION

This invention relates to a method for manufacturing a structure which has fine ribs or projections arranged in a stripe, lattice or honeycomb pattern on its surface. The structure is used as a component part of a plasma display panel or of a chemical reaction apparatus. The invention also relates to a method for manufacturing a mold used for manufacturing the structure.

Attention is now being paid to a plasma display panel as an image display apparatus which is thin and has a big screen. The rear or front panel of the plasma display panel has fine ribs which constitute barrier walls and are arranged in a predetermined pattern. In the case of, for example, the rear panel, ribs with a width of about 50 $\mu$m and a height of about 100 $\mu$m are arranged at regular intervals in a stripe pattern.

Further, in a chemical apparatus, a structure with fine ribs (whose arrangement patterns depend upon their functions) is used as a filter for classifying fine particles; a catalyst; or a catalyst carrier for accelerating burning, synthesis, decomposition, etc.; a micro organism, or a polar plate.

These ribs are required to have a highly precise configuration and dimension. In the conventional art, such ribs are manufactured by various methods such as multiplex printing, pressure molding, etching, sand blast, an electrolytic treatment, an electric spark machining, etc.

As described above, structures with fine ribs are manufactured by various methods according to their respective configurations, purposes or properties required. These methods, however, have the following problems concerning precision in configuration or dimension, manufacturing cost, etc.:

a) In the case of multiplex printing, ribs are formed by repeating screen printing and curing ten or more times. Accordingly, the ribs have side surfaces of low flatness, and hence show a low precision in configuration and position. Further, the process of the manufacture of the ribs requires a great amount of time, which results in a high manufacturing cost.

b) In the case of etching, if the rate of etching is increased to shorten the manufacturing time, the precision in configuration and position of each barrier wall inevitably decreases, with the result that the tips or bottom corners of the ribs cannot have desired configurations. In light of this, the etching rate cannot be increased, which means that a great amount of time and a high manufacturing cost are required. Moreover, the material of the ribs is limited to a chemically corrodable one. In addition, if the material of the ribs has a large crystal grain size, the ribs cannot have a high configuration precision, a high profile regularity, and cross sections which satisfy their specification.

c) In the case of the sand blast, it is not easy to enhance the configuration precision since the cutting rate is greatly influenced by changes in working conditions. In particular, it is difficult to control the height of each rib with a high precision. Moreover, during working, a great amount of cutting particles or fine dust may occumulate, thereby contaminating the working environment or requiring additional labor for waste disposal.

BRIEF SUMMARY OF THE INVENTION

It is the object of the invention to provide a method for manufacturing, in a relatively short time and at a low cost, a structure having fine ribs on its surface, formed with a high precision in configuration and position.

According to a first aspect of the invention, there is provided a method for manufacturing a structure with fine ribs, which comprises the steps below.

(a) To prepare a composite sheet which comprises an elastic surface layer and a base layer with a higher rigidity than the surface layer. The surface layer has grooves of a predetermined cross section arranged in a two-dimensional pattern.

(b) To fill the grooves of the composite sheet with a paste material.

(c) To cure the paste material to form ribs by evaporating solvent or chemical action.

(d) To laminate a substrate on the composite sheet, and press the composite sheet against the substrate from the base layer side, thereby compressing the ribs and adhering them to the substrate.

(e) To remove the ribs and the substrate from the composite sheet. As the result, the structure with fine ribs on the substrate is obtained.

Preferably, the surface layer is formed of rubber. More preferably, the surface layer is formed of a material with a low adhesive surface, such as silicone rubber.

Preferably, the base layer is formed of a thin steel sheet.

Typical conditions for manufacturing the rear panel or the front panel of a plasma display panel are explained below The surface layer is made of rubber and has a thickness falling within a range of 0.3 mm–1 mm. The base layer is formed of a metal sheet and has a thickness falling within a range of 0.2 mm–0.5 mm. The ribs have a width of not less than 20 $\mu$m and not more than 100 $\mu$m, and a height of not less than 20 $\mu$m and not more than 200 $\mu$m.

Further preferably, the grooves each have a surface portion which is wider than a deeper portion thereof. By virtue of this structure, that base portion of each rib which is adhered to the substrate is formed in the surface portion of a corresponding groove when the grooves are filled with the paste material.

Also preferably, the composite sheet is vibrated from the base layer side at the time of filling the grooves with the paste material, to accelerate the flow of the paste material into the grooves.

Where the paste material contains a solvent, it is preferable that at the time of curing the material, evaporation of the solvent is accelerated by reducing pressure around the surface layer and heating the surface layer.

If necessary, the surface of the substrate or the ribs is coated with an adhesive before the ribs are adhered to the substrate.

A structure consisting of only the ribs can be formed by removing the ribs from the substrate after removing the ribs and the substrate from the composite sheet.

Moreover, a structure, which comprises a plurality of layers laminated on one another and each including ribs, can be formed by repeating the step of adhering the ribs on the substrate.

The method of the invention enables manufacturing of a structure with fine ribs in a smaller number of process steps than the case of using the conventional method. The ribs formed by the method of the invention have a high precision in side surface regularity, configuration and position.

According to a second aspect of the invention, there is provided a method for forming grooves, arranged in a two-dimensional pattern, on an elastic body constituting the surface layer of the composite sheet. To form such grooves, a mold is used. This mold is produced by electroforming, electric spark machining, etching, etc.

In the case of the electroforming, the mold is produced in a manner as below.

First, an inverse mold which has first grooves arranged in a predetermined pattern in a surface thereof is formed using a cutting or grinding tool. Then, using the inverse mold, an electroformed mold which has projections corresponding to the first grooves is formed. As a result, an electroformed mold with a high precision in configuration and position is obtained.

If necessary, part of the projections from the electroformed mold is removed after forming the electroformed mold, thereby obtaining projections arranged in a pattern corresponding to a partially modified one of the arrangement pattern of the first grooves. This means that the inverse mold used for forming a composite sheet with a complicated surface pattern can be produced relatively easily.

In the case of using the electric spark machining, the mold is formed in a manner as below.

First, a cylindrical electrode is prepared, which is supported such that it can rotate about an axis thereof, and has a plurality of grooves formed in an outer periphery thereof and extending circumferential.

Then, the electrode is relatively moved along a surface of an item to be worked, thereby subjecting the item to an electric spark machining and converting the item into a mold which has surface portions corresponding to the grooves left in the form of projections and the other surface portions removed. A graphite-based electrode material is preferable as the material of the electrode, since it has a high conductivity and machinability and a low wear rate.

The projections can be formed with a high configuration precision if the electrode is rotated periodically in units of a predetermined angle in accordance with the degree of wear on the electrode.

Alternatively, the projections can be formed with a high configuration precision if the electrode is periodically rotated in units of a predetermined angle at each process step from a rough working to a finish working.

A mold having projections arranged in a two-dimensional pattern can be produced by steps as below.

(a) A cylindrical electrode is prepared, which is supported such that it can rotate about an axis thereof, and has a plurality of grooves formed in an outer periphery thereof and extending circumferential.

(b) The electrode is relatively moved in a first direction along a surface of an item to be treated, thereby subjecting the item to an electric spark machining and removing surface portions of the item which do not correspond to the grooves.

(c) The electrode is further relatively moved along the surface of the item in a second direction crossing the first direction, thereby subjecting the item to another electric spark machining.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The embodiments of the invention will be described with reference to the accompanying drawings.

(First Embodiment)

Figure 1:
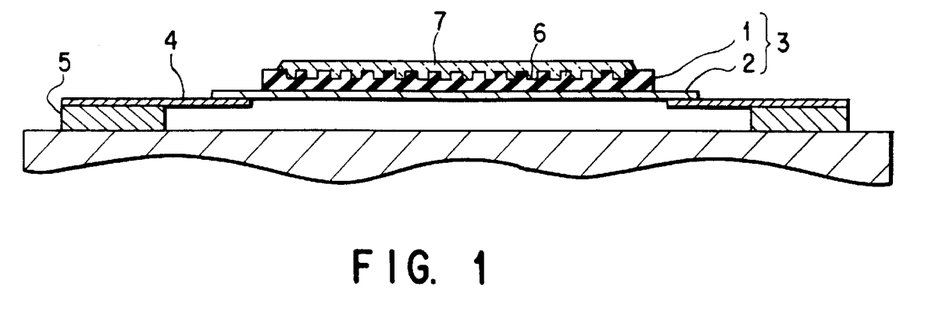
FIG. 1 is a cross sectional view, showing a composite sheet and its support structure for use in a method according to the invention.

FIG. 1 is a cross sectional view, showing a composite sheet and its support structure for use in a method according to the invention for manufacturing a structure with fine ribs. In FIG. 1, reference numeral 1 denotes a surface layer, reference numeral 2 a base layer, reference numeral 6 a groove, and reference numeral 7 a paste material.

A composite sheet 3 is formed by laminating the surface layer 1 on the base layer 2. In this embodiment, the surface layer 1 is made of rubber and has elasticity. On the other hand, the base layer 2 is formed of a steel sheet and is much more rigid than the surface layer 1. Multiple fine grooves 6 are formed in the surface layer 1 of the composite sheet 3. The depth of the groove 6 is about half the thickness of the surface layer 1. In FIG. 1, the paste material 7 is coated on the surface layer 1 and covers the grooves 6. The composite sheet 3 is set to a frame 5 via a deformable support sheet 4 such that it horizontally bridges the frame.

If the surface layer 1 is made of a material with a low-adhesion surface such as silicone rubber with a hardness of about Hs 30 (JIS-A), silicone rubber mixed with fluororesin, or fluoro-rubber, the paste material 7 or an adhesive is prevented from adhering to the surface layer 1, or can be easily peeled off even when it adheres to the layer 1.

Figure 2:
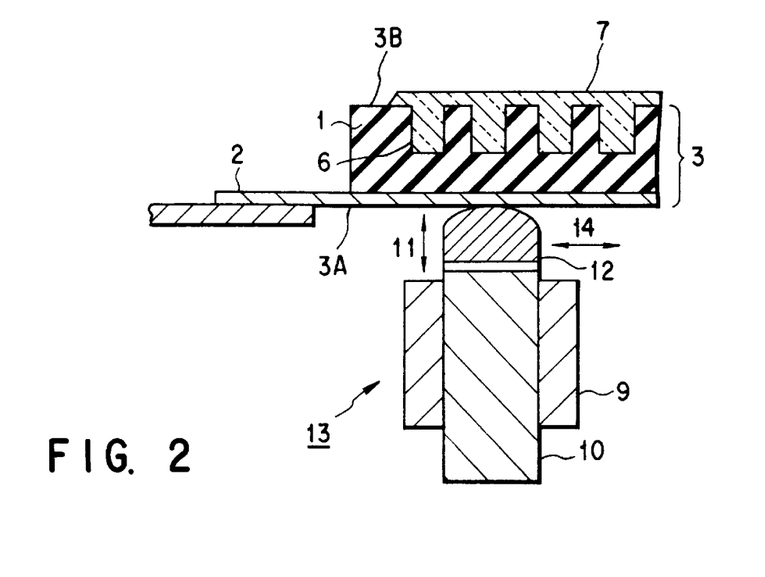
FIG. 2 is an enlarged sectional view, explaining a method for filling grooves in the composite sheet with a paste material.

FIG. 2 is a fragmentary enlarged sectional view, explaining how to fill the grooves of the composite sheet with the paste material.

After the surface layer 1 is coated with the paste material 7 such that the grooves 6 are covered, a shaker 13 is brought into contact with the lower surface 3A of the composite sheet 3. The shaker 13 comprises a vibrator 12, a coil 9 and a magnetic passage 10. The vibrator 12 is moved parallel to the composite sheet 3 (i.e. in a direction indicated by arrow 14), being kept vibrating perpendicular to the composite sheet 3 (i.e. in a direction indicted by arrow 11). As a result, portions of the composite sheet 3 vibrate sequentially, which enables the grooves 6 to be filled with the paste material 7 without any clearance.

Thereafter, that portion of the paste material 7 which overflows from each groove 6 is removed, and those portions of the upper surface 3B of the composite sheet 3 which are other than the grooves 6 are cleaned. This is the termination of the process of filling the grooves 6 with the paste material 7.

Figure 3:
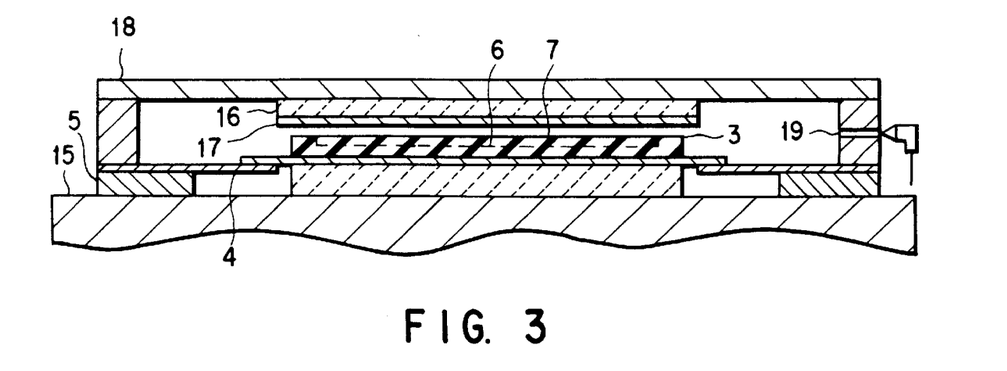
FIG. 3 is a schematic sectional view, showing an apparatus for curing the paste material in the grooves of the composite sheet.

FIG. 3 shows an apparatus for curing the paste material in the grooves 6 of the composite sheet.

The composite sheet 3 having the grooves 6 filled with the paste material 7 is mounted on a table 15 together with the frame 5. Then, a case 18 is placed to enclose the composite sheet 3. A heater 17, which is attached on the ceiling of the case 18 with a heat insulating plate 16 interposed therebetween, is opposed to the upper surface of the composite sheet 3. An air hole 19 is formed in a side wall portion of the case 18. When the pressure in the space defined by the case 18, the sheet 3 and the frame 5 is reduced by exhausting air through the air hole 19, evaporation of a solvent contained in the paste material is accelerated and the paste material is cured. If, at this time, the evaporation heat of the solvent reduces the temperature of the composite sheet 3, the sheet 3 contracts, the dimension of the groove 6 decreases, and the groove pitch changes. To avoid temperature reduction of the composite sheet 3, the heater 17 is used to heat the surface of the sheet. Thus, the paste material 7 is cured in the grooves 6 of the composite sheet 3, thereby forming ribs 8.

Figure 4:
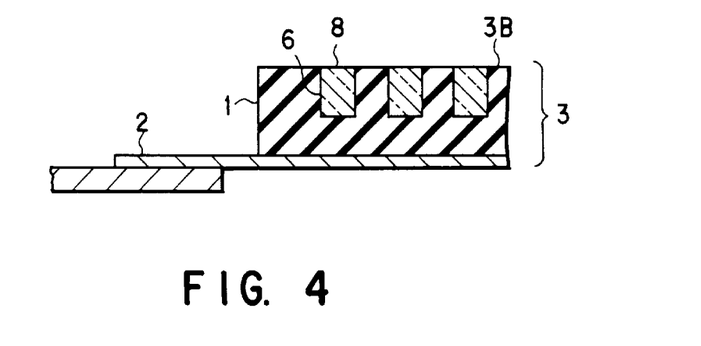
FIG. 4 is a fragmentary enlarged sectional view, showing a state in which a rib is formed in each groove of the composite sheet.
Figure 5:
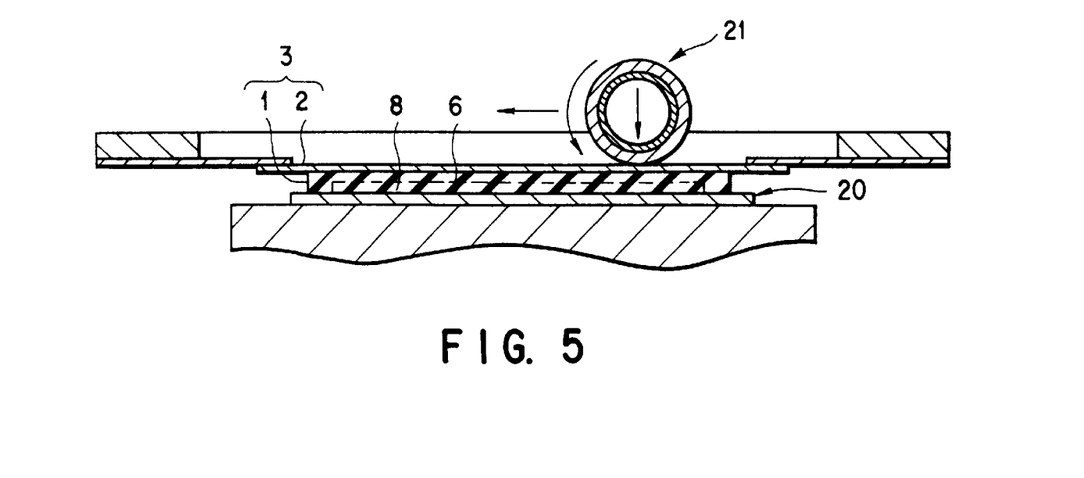
FIG. 5 is a sectional view, explaining a method for adhering each rib formed in the grooves to a substrate.
Figure 6:
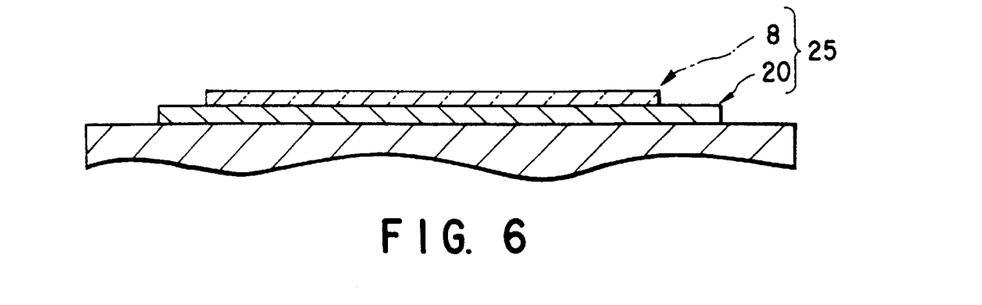
FIG. 6 is a sectional view, showing a structure obtained by adhering the rib to the substrate.
Figure 7:
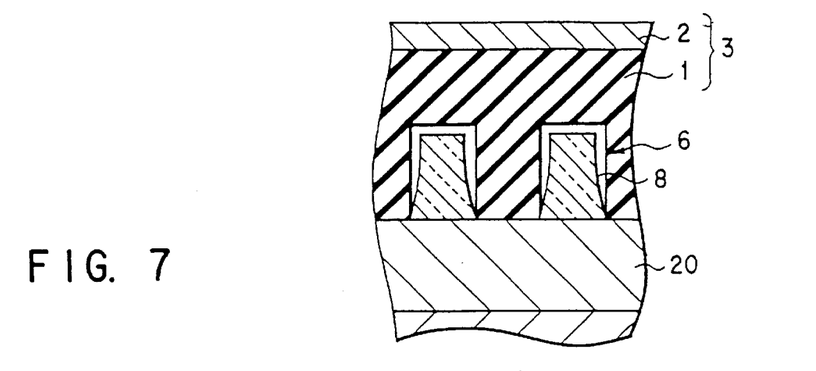
FIG. 7 is a fragmentary enlarged sectional view of the composite sheet and the substrate, showing a state in which the ribs are adhered to the substrate.

FIG. 4 is a fragmentary enlarged sectional view, showing the composite sheet 3 with the ribs 8 formed in the grooves 6. FIG. 5 is a sectional view, explaining a method for adhering the ribs 8 to a substrate 20. FIG. 6 is a sectional view, showing a structure 25 which is formed by adhering the ribs 8 to the substrate 20. FIG. 7 is a fragmentary enlarged sectional view, showing the composite sheet 3 and the substrate 20 in which the ribs 8 are adhered to the substrate.

The surface layer 1 of composite sheet 3 shown in FIG. 4 is coated with an adhesive using a roller. Since the surface layer 1 of the sheet 3 is made of rubber with a low-adhesion surface, the adhesive does not adhere to the surface layer 1 (i.e. to the surface 3B of the sheet 3), but only to the surfaces of the ribs 8. Then, as is shown in FIG. 5, the composite sheet 3 is laminated on the substrate 20 such that the surface of the sheet 3 in which the grooves 6 filled with the ribs 8 are provided contacts with the substrate 20. Subsequently, the composite sheet 3 is pressed against the substrate 20 from the base layer 2 side by means of a roller 21, thereby adhering the ribs 8 to the substrate 20. Thereafter, the ribs 8 and the substrate 20 are separated from the composite sheet 3, with the result that the structure 25 is obtained in which the fine ribs 8 are arranged on the substrate 20 with a predetermined pitch as shown in FIG. 6.

When the composite sheet 3 is pressed by the roller 21 as shown in FIG. 5, the surface layer 1 made of rubber is compressed, thereby deforming each groove 6 such that its width is slightly narrower at its center portion in the thickness direction of the surface layer 1 as the ribs 8 shown in FIG. 7. As a result, the volume of each groove 6 decreases, which makes each rib 8 have an increased density and a tapered configuration and hence enables easy removal of it from the groove 6. This being so, the ribs 8 can be formed on the substrate 20 such that they have a predetermined cross section and plan pattern and no defects.

The above-described process enables manufacture of structures having configurations which accord with various purposes. If necessary, the resultant structure is subjected to sintering, a surface treatment, etc.

Since there is the possibility that the positional precision of the rib 8 will decrease if the surface layer 1 has a thickness of more than 1 mm, it is necessary to set the thickness or hardness of the surface layer 1 to an appropriate value when a structure with a high precision should be manufactured.

Where the grooves 6 have a width of 70 $\mu$m or more and a depth of 100 $\mu$m or less, the paste material 7 provided on the composite sheet 3 will easily flow into the grooves 6. Accordingly, it is not necessary to use the shaker 13 shown in FIG. 2.

On the other hand, when the grooves 6 do not satisfy the above conditions, the shaker 13 is used to sufficiently fill the grooves 6 with the paste material 7. For example, where the grooves 6 have a width of 20 μm and a depth of 30 μm, or they have a width of 50 μm and a depth of 200 μm, vibration with a frequency of 150 Hz and an amplitude of 5 μm is applied to the composite sheet 3 by the shaker 13, while the shaker 13 is moved at a speed of 50 mm/min. As a result, voids are removed from the grooves 6, and ribs 8 with no defects are formed.

To cure the paste material 7 in the grooves 6, a chemical may be coated thereon, ultraviolet rays be applied thereto, or a reactive gas be brought into contact therewith.

Unlike the case of FIG. 4, an adhesive may be coated on the substrate 20 not on the composite sheet 3. In this case, the bonding force between the non-adhesive outer surface 3B of the surface layer 1 and the adhesive is small, and the composite sheet 3 can easily be removed from the substrate 20. Further, if the paste material 7 contains a solvent and an adhesive, the coating of the adhesive can be omitted.

In addition, to uniformly press the composite sheet 3, a pressure chamber or an air sac may be provided above the composite sheet 3 in place of using the roller 21 shown in FIG. 5.

(Second Embodiment)

The rear panel of the plasma display panel has a configuration similar to that of the structure 25 shown in FIG. 6, and has multiple platelike ribs with, for example, a width of 50 μm and a height of 120 μm arranged thereon parallel to each other with a predetermined pitch. This rear panel can be manufactured by the method of the invention under conditions as below.

The composite sheet 3 was formed of a surface layer 1 made of silicone rubber and having a thickness of 0.3 mm, and a base layer 2 made of 36% nickel steel with an extremely small coefficient of thermal expansion and having a thickness of 0.3 mm. A mixture of 100 parts by weight of low melting glass powder (average particle diameter: 1 μm), 25 parts by weight of a solvent (butyl carbitol acetate), and 10 parts by weight of an adhesive was used as the paste material.

After the grooves of the composite sheet were filled with the paste material, the sheet was kept at 25° C. for 5 minutes under the atmospheric pressure, thereby evaporating the solvent contained in the paste material and curing the material. The resultant structure was pressed against a flat glass substrate with a thickness of 3–5 mm, and then the composite sheet was removed to obtain a structure with an area of 230×400 mm in which ribs are provided. This structure was predried at 150° C. for 10 minutes, and then sintered at 560° C. for 10 minutes. As a result, a rear panel of PDP was obtained.

The positional precision of each rib in a direction parallel to the surface of the rear panel was ±15 μm in the area of 230×400 mm in which the ribs were provided, while the smoothness of a side surface of each rib was 2 μm Rmax, which was equal to that of a wall face of each groove 6 in the composite sheet. Thus, it was confirmed that the present invention can provide ribs of sufficient precision in configuration and position.

(Third Embodiment)

Figure 8:
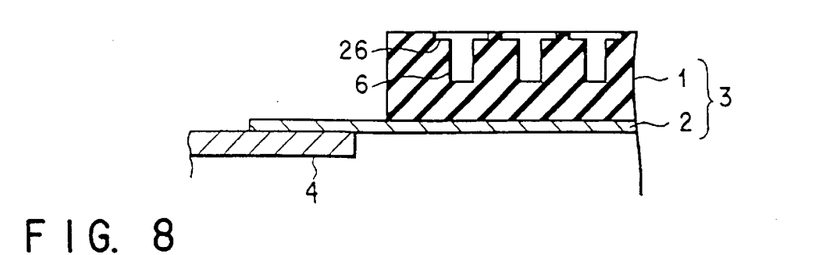
FIG. 8 is a fragmentary enlarged sectional view, showing a case where T-shaped grooves are formed in the composite sheet such that a horizontal portion of each T-shaped groove is level with the surface of the composite sheet.
Figure 9:
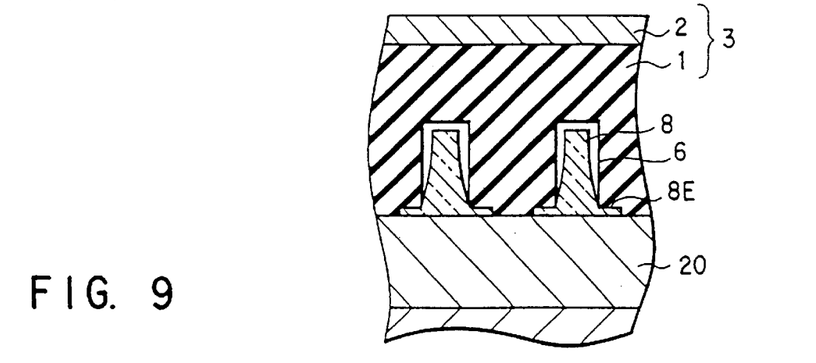
FIG. 9 is a fragmentary enlarged sectional view, showing the configuration of each rib formed in the composite sheet of FIG. 8.

FIG. 8 shows an example of a groove formed in the surface layer 1 of the composite sheet to obtain a relatively narrow rib. FIG. 9 shows the cross section of the rib formed by the composite sheet of FIG. 8.

Where the rib 8 has a relatively narrow width of about 20 μm, it is difficult to remove from the groove 6. In this case, the groove 6 is made to have a surface portion 26 which is wider than its deeper portion, as is shown in FIG. 8. When the paste material is filled into the surface portion 26, a base portion 8E which constitutes part of the rib 8 is formed therein. This means that the joint area and hence the bonding force between the rib 8 and the substrate 20 increases, and accordingly the rib 8 can easily be removed from the groove 6. Thus, ribs with no defects can be obtained.

(Fourth Embodiment)

Figure 10:
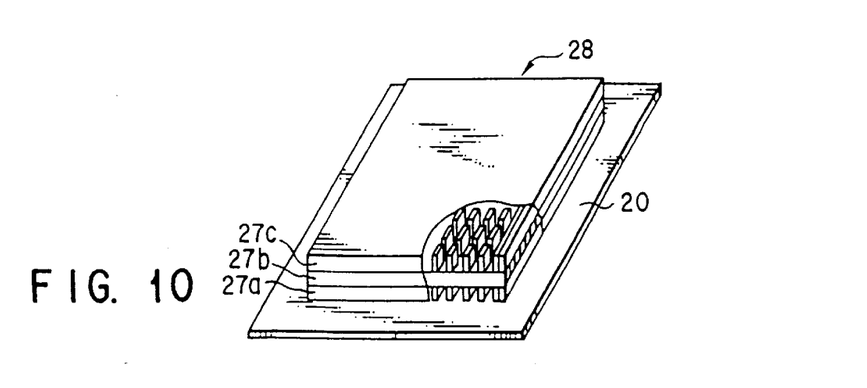
FIG. 10 is a view, showing an example of a structure in which a plurality of layers of ribs are laminated by repeating the method of the invention.

FIG. 10 shows an example of a structure in which a plurality of layers of ribs are laminated by repeating the method of the invention.

In the process shown in FIG. 5, the structure 25 shown in FIG. 6, in which the ribs 8 are already mounted on the substrate 20, is used in place of the flat substrate 20 on which ribs are to be mounted. By the method of FIG. 5, another layer of ribs is adhered to the structure 25 such that the ribs of the lower layer are perpendicular to those of the upper layer. As a result, a structure 28 can be obtained which comprises a plurality of rib layers 27a, 27b, 27c laminated on each other such that the ribs of each layer are perpendicular to those of an adjacent layer.

If the substrate 20 is removed from the structure 28, a structure which is constituted of laminated layers of ribs is obtained. Similarly, if the substrate 20 is removed from the structure 25 which includes a single layer of ribs as shown in FIG. 6, a structure which is constituted of only a single layer of ribs is obtained.

A micro organism carrier for use in a chemical device has a configuration similar to that of the structure obtained by removing the substrate 20 from the structure 28, shown in FIG. 10, with a plurality of rib layers 27 laminated on each other. Such micro organism carrier can be manufactured by the method of the invention under conditions as below.

A composite sheet was used, which comprises a surface layer made of silicone rubber and having a thickness of 0.6 mm, and a base layer made of austenite stainless steel and having a thickness of 0.5 mm. A mixture of 100 parts by weight of low sodium alumina (average particle diameter: 3 μm), 0.5 part by weight of a peptizer (acrylic acid oligomer), and 32 parts by weight of water was used as the paste material.

After the grooves of the composite sheet were filled with the paste material, the sheet was kept at 25° C. for 15 minutes under a vacuum pressure of 300 Torr, thereby evaporating moisture and curing the paste material. As a result, ribs having a width of 100 μm and a height of 250 μm and arranged in the form of a lattice were formed. The resultant structure was mounted on the substrate 20, and then the composite sheet was removed to obtain a structure with a single rib layer 27. Thereafter, other rib layers 27 were laminated on the structure such that the ribs of each layer were perpendicular to those of an adjacent layer, thereby removing the substrate 20 and obtaining a lamination structure of 1000×1000 mm. This lamination structure was preheated at 1000° C., and then sintered at 1650° C. for 30 minutes. As a result, an alumina-based micro organism carrier was obtained.

(Fifth Embodiment)

A process for forming a mold and a composite sheet for use in the above-described manufacturing method will now be described.

FIGS. 11 to 19A and 19B are views, explaining an example of a process, according to the invention, for manufacturing a structure having fine ribs.

Figure 11:
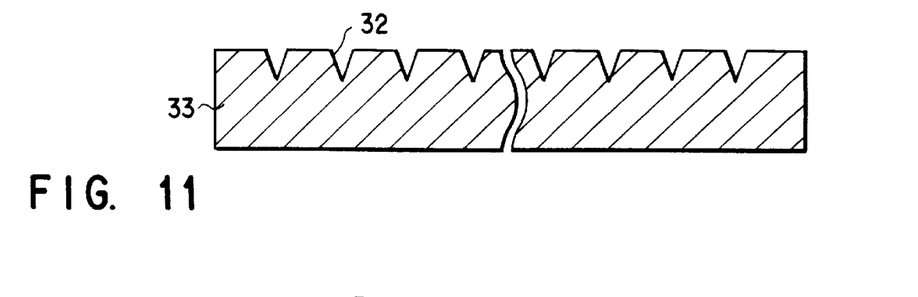
FIG. 11 is a schematic sectional view, showing an inverse mold used in a process for manufacturing a mold according to the invention.

First, the surface of a flat plate made of an aluminum alloy is machined using a cutting tool, to form an inverse mold 33 which has grooves 32 (first grooves) with a configuration corresponding to that of a rib as shown in FIG. 11. A copper alloy, a hard plastic, etc., which has a good machinability, may be used as the material of the inverse mold 33 as well as the aforementioned aluminum alloy.

Figure 12:
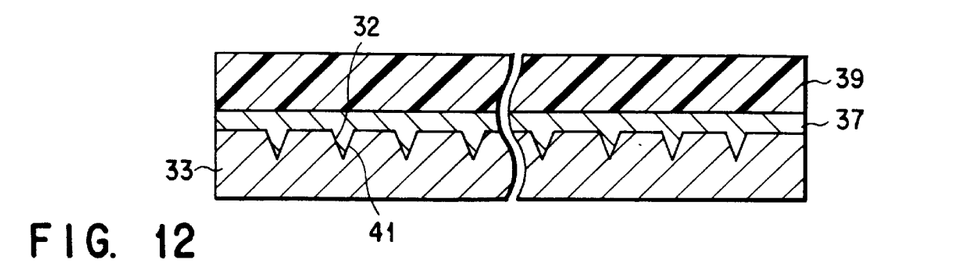
FIG. 12 is a sectional view, showing a state in which an electrodeposition layer and a support layer are laminated on the inverse mold in this order.

Subsequently, as shown in FIG. 12, a metal (e.g. nickel) is electrodeposited on the inverse mold 33 to form an electrodeposition layer 37 with projections 41 corresponding to the grooves 32 of the inverse mold 33. A liquid adhesive is sprayed onto the back face of the electrodeposition layer 37 to form a support member 39.

Figure 13A:
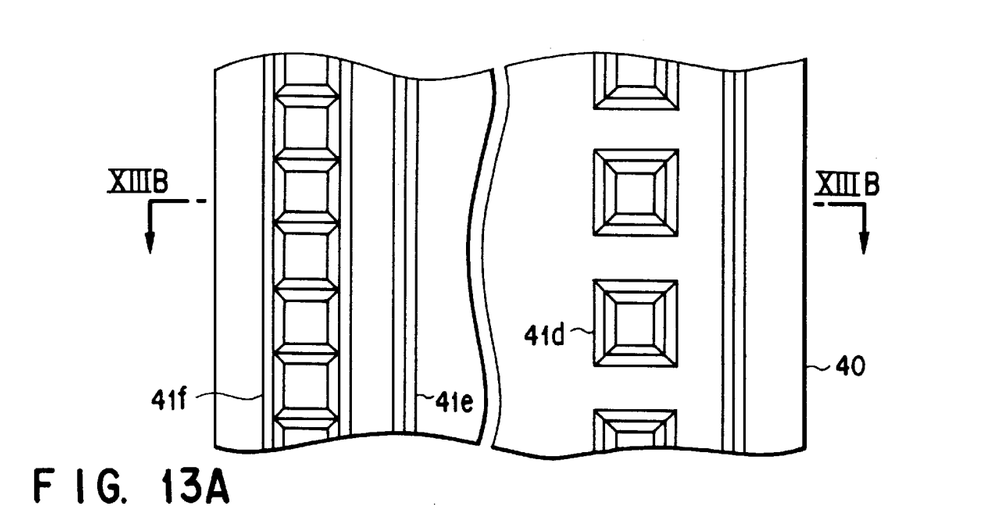
FIG. 13A is a schematic plan view, showing an electroformed mold obtained by removing the inverse mold.
Figure 13B:
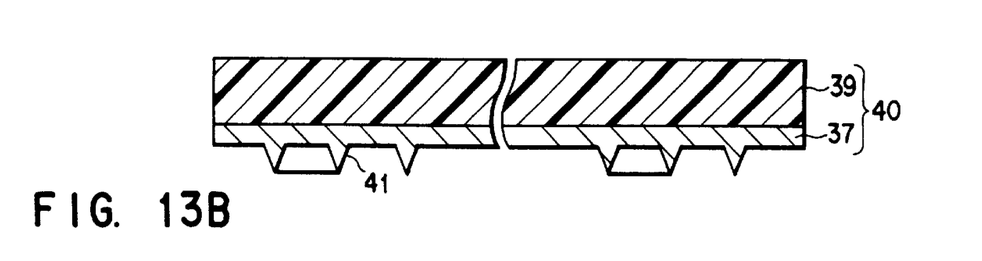
FIG. 13B is a sectional view, taken along the cutting line of FIG. 13A.

When the inverse mold 33 is removed from the structure of FIG. 12 which comprises the inverse mold 33, the electrodeposition layer 37 and the support member 39 laminated thereon, an electroformed mold 40 is obtained which includes the electrodeposition layer 37 supported by the support member 39 and having projections 41$d$, 41$e$ and 41$f$ of predetermined configurations, as is shown in FIGS. 13A and 13B. The surface configuration of the electroformed mold 40 may be partially modified by removing part of the projection 41$f$.

Figure 14:
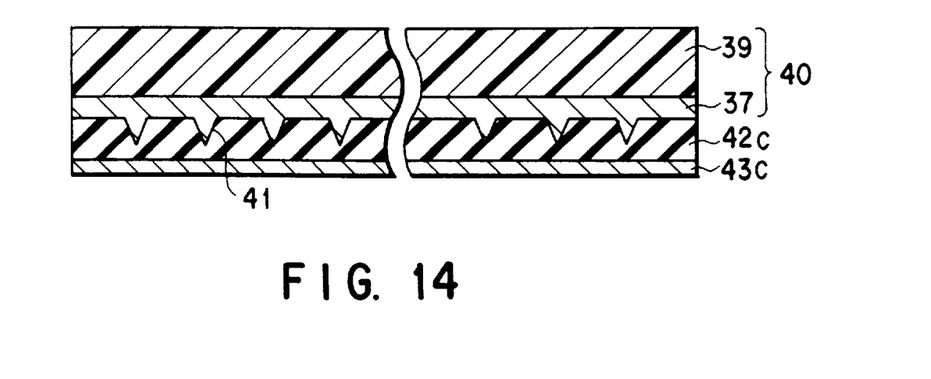
FIG. 14 is a sectional view, showing a state in which silicone rubber is coated on the electroformed mold, and a metal sheet is attached to the back face of the silicon rubber.
Figure 15:
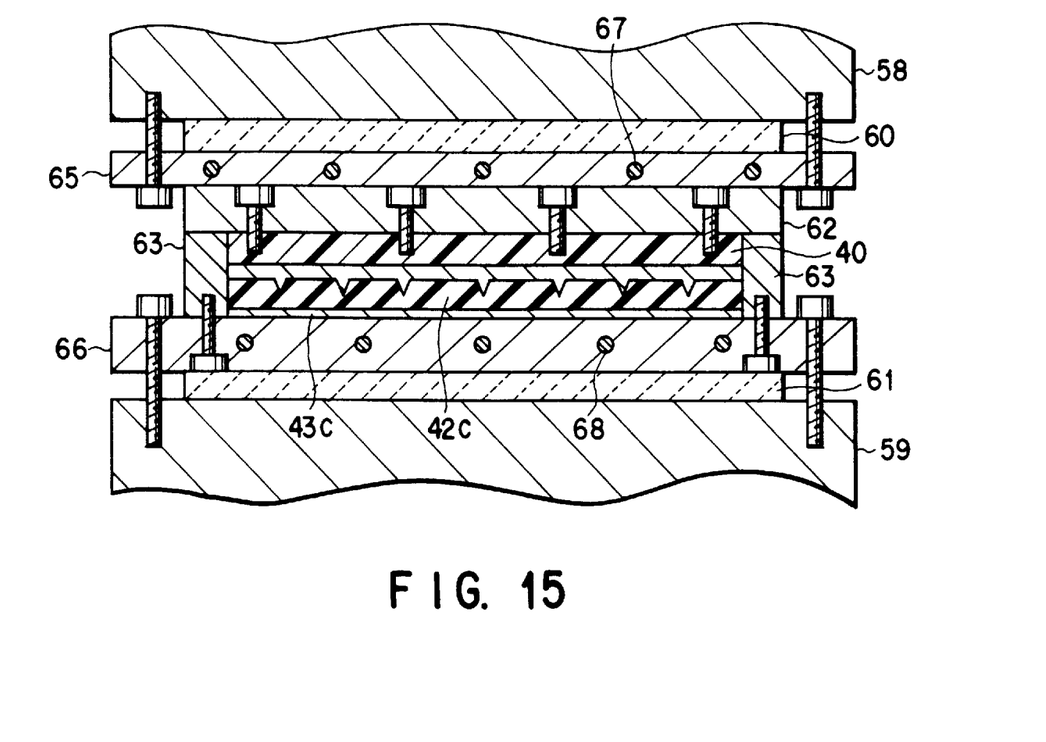
FIG. 15 is a sectional view, showing a state in which the electroformed mold, silicone rubber and the metal sheet are set in a press forming machine.

Thereafter, as is shown in FIG. 14, silicone rubber 42$c$ is coated onto the thus-obtained electro-formed mold 40, and a metal sheet 43$c$ is mounted on the back face of the silicone rubber 42$c$. The resultant structure is set in the press forming machine (FIG. 15). As will be described below, forming of the silicone rubber 42$c$ and adhesion of the silicone rubber 42$c$ and the metal sheet 43$c$ are simultaneously performed by the press forming machine.

As is shown in FIG. 15, the press forming machine comprises a press head 58 as a movable upper member, a die plate 59 as a stationary lower member opposed to the press head 58, etc. A seat plate 65 is fixed via a heat insulating plate 60 on the lower surface of the press head 58, and an attachment plate 62 is fixed on the lower surface of the seat plate 65. On the other hand, a seat plate 66 is fixed via a heat insulating plate 61 on the upper surface of the die plate 59. Heaters 67 and 68 are incorporated in the upper and lower seat plates 65 and 66, respectively. The back face of the electroformed mold 40 is secured to the lower surface of the attachment plate 62, while the back face of the metal sheet 43$c$ is supported by the upper surface of the seat plate 66. Moreover, the electroformed mold 40, the silicone rubber 42$c$ and the metal sheet 43$c$ are surrounded with a housing 63.

Figure 16:
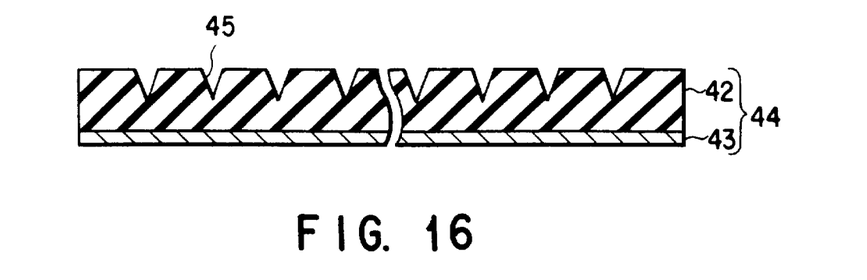
FIG. 16 is a schematic sectional view, showing a composite sheet formed by press forming.

The electroformed mold 40, the silicone rubber 42$c$ and the metal sheet 43$c$ are heated to 140 to 180° C., and then the silicone rubber 42$c$ is compressed by the press head 58. As a result, curing of the silicone rubber 42$c$ and adhesion of the silicone rubber 42$c$ to the metal sheet 43$c$ are simultaneously performed, and a composite sheet 44 as shown in FIG. 16 is obtained. The resultant composite sheet 44 comprises an elastic surface layer 42 having a low adhesive surface, and a base layer 43 of a high rigidity. The surface layer 42 have grooves 45 (second grooves) corresponding to the projections 41.

In the above process, an elastic material with a low adhesive surface, such as fluoro rubber, may be used as the material of the surface layer 42, as well as silicone rubber. Further, a thin plate member with a high resistance against load applied in the direction of thickness and in a direction parallel to the surface is used as the base layer 43. For example, a hard plastic sheet can be used as well as the aforementioned metal sheet.

Figure 17:
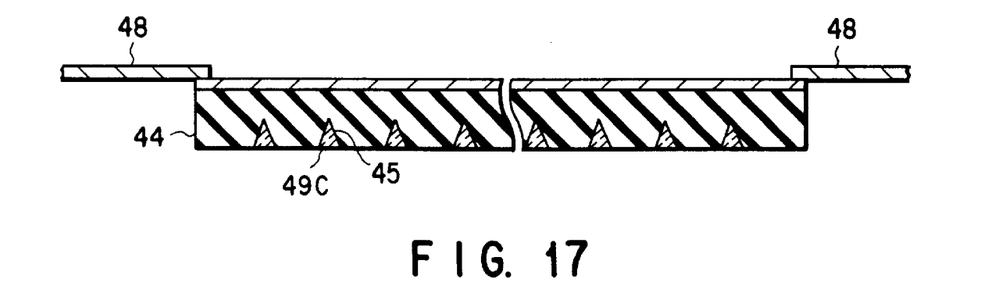
FIG. 17 is a sectional view, showing a state in which grooves formed in the surface of the composite sheet are filled with a paste material.

Thereafter, where the composite sheet 44 is held by a support sheet 48, the grooves 45 of the composite sheet 44 are filled with a paste material 49$c$, as is shown in FIG. 17. The resultant structure is dried and heated to cure the paste material 49$c$.

Figure 18:
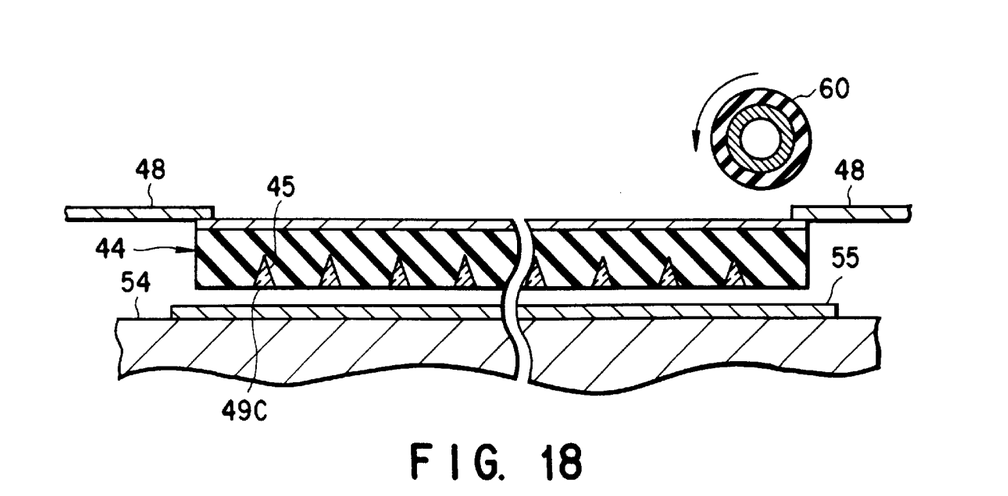
FIG. 18 is a sectional view, explaining a method for adhering the paste material to a substrate.

Then, as is shown in FIG. 18, a flat substrate 55 is mounted on a table 54, and the surface of the composite sheet 44 which is provided with the grooves and the paste material is brought into tight contact with the substrate 55. In this state, the composite sheet 44 is pressed by a press roll 60 from its back side to adhere the paste material 49$c$ to the substrate 55. When the composite sheet 44 is removed from the substrate 55, a structure with the substrate 55 and ribs 49 mounted thereon is obtained as shown in FIGS. 19A and 19B.

The paste material 49$c$ is a mixture of metal, glass or ceramic powder, a solvent, an adhesive, a hardness adjusting agent, etc. The ribs 49 can have various properties by changing the composition of the paste material 49$c$.

Figure 19A:
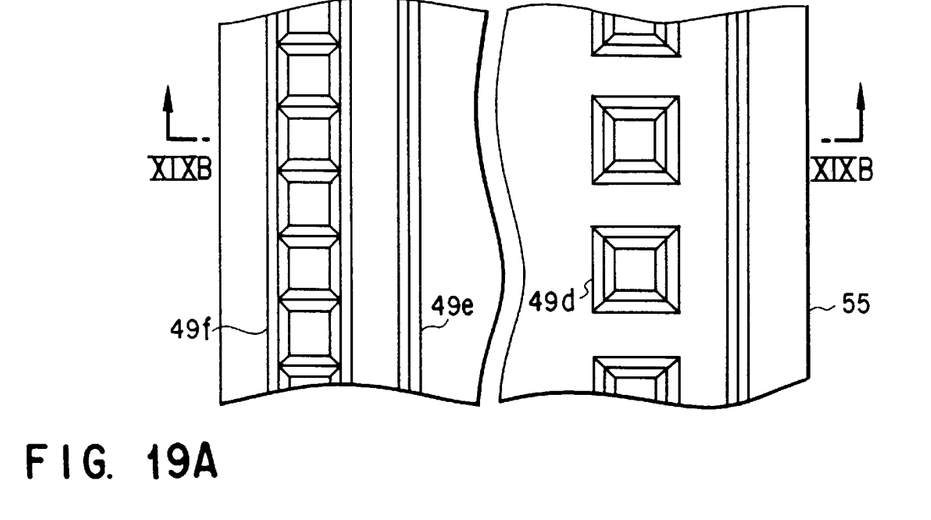
FIG. 19A is a plan view, showing a structure produced by the method of the invention and having barrier walls formed thereon.
Figure 19B:
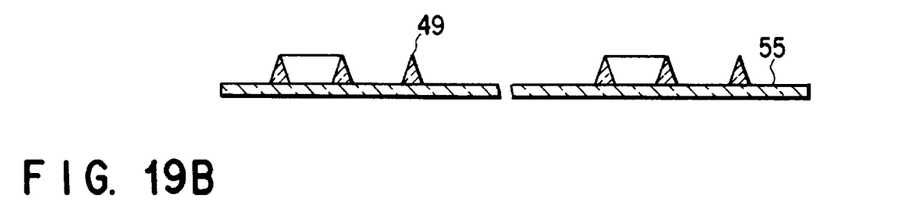
FIG. 19B is a sectional view, taken along the cutting line of FIG. 19A.

As well as a linear ribs 49$e$ shown in FIG. 19A, ribs 49$d$ and 49$f$ can be formed which have annular portions surrounding surface portions of the substrate 55.

The linear ribs 49$e$, which are to be mounted on the rear panel of an AC plasma display panel, have a height of 50 to 300 μm and an average thickness of 20 to 200 μm and are arranged with a pitch of 100 to 2000 μm. The paste material 49$c$ is a mixture of 100 parts by weight of low melting glass powder (average particle diameter: 1 μm), 25 parts by weight of a solvent (butyl carbitol acetate), and 10 parts by weight of an adhesive. The adhesive is mixed to firmly secure the rib 49$e$ to the substrate 55.

The ribs 49$f$ with annular portions are to be mounted on the rear panel of a DC plasma display panel, and their material and typical sizes are similar to the above. Moreover, if the ribs 49$f$ with annular portions are to be mounted on the front panel of an AC plasma display panel, they are made to have a height of 20 to 50 μm and an average of 20 to 50 μm.

(Sixth Embodiment)

Another process for forming the mold for use in the manufacturing method of the invention will be described.

Figure 20:
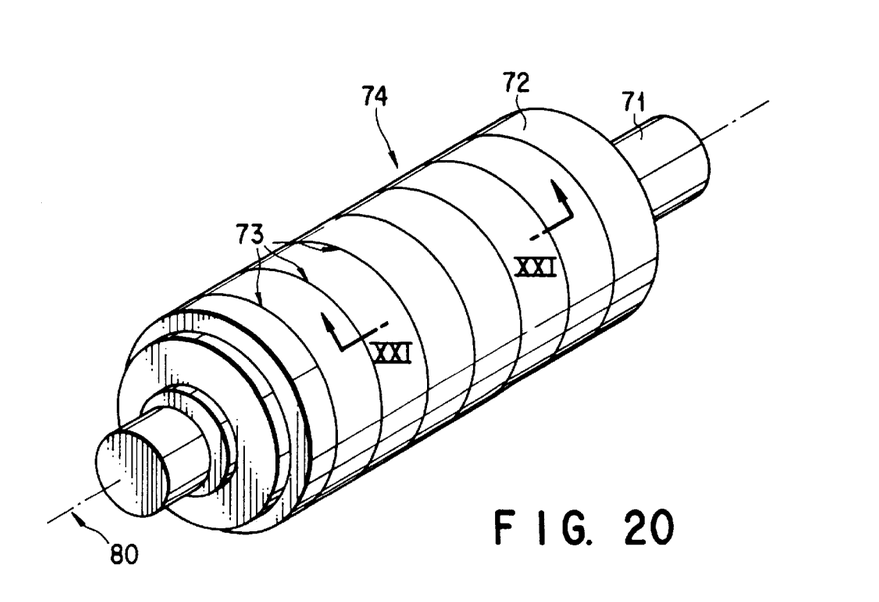
FIG. 20 is a schematic view, showing an electrode of electric spark machine used in the method of the invention.

FIG. 20 shows the structure of an electrode employed in the process for an electric spark machining.

An electrode 74 comprises a steel mandrel 71, and a cylindrical electrode portion 72 mounted on the periphery of the mandrel 71 and made of a graphite-based material. The electrode portion 72 is processed with a high precision such that its axis coincides with the axis 80 of the mandrel 71 within a range of 2 to 3 μm, and is arranged to rotate about the axis 80. A plurality of grooves 73 are circumferentially formed in the outer periphery of the electrode portion 72. This cylindrical electrode portion is used for a general electric spark machining, and a long one which has a length of about 1000 mm can be relatively easily obtained. The grooves 73 can be formed in the outer periphery of the electrode portion 72 with a high precision, by a turning with a ceramic cutting tool or a grinding with a whetstone of thin outer periphery.

Figure 21:
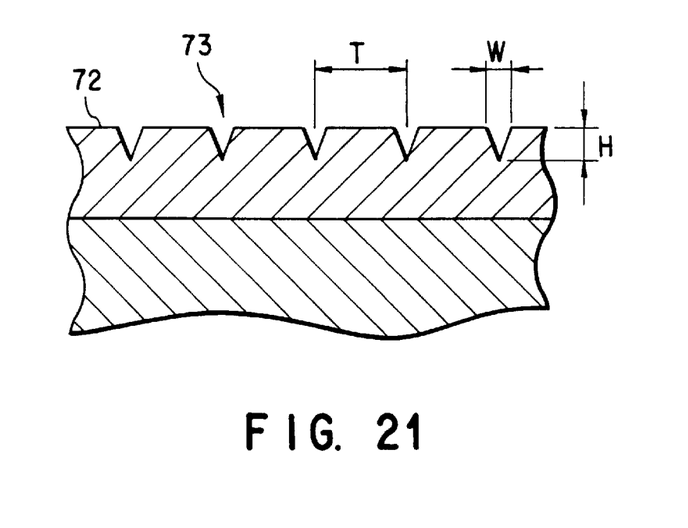
FIG. 21 is a fragmentary sectional view, taken along the cutting line of FIG. 20.

FIG. 21 is an example of a sectional view of the grooves 73. In this example, the grooves 73 have a V-shaped cross section with a width (W) of 70 μm and a depth (H) of 200 μm, and are arranged with a pitch (T) of 150 μm.

Figure 22:
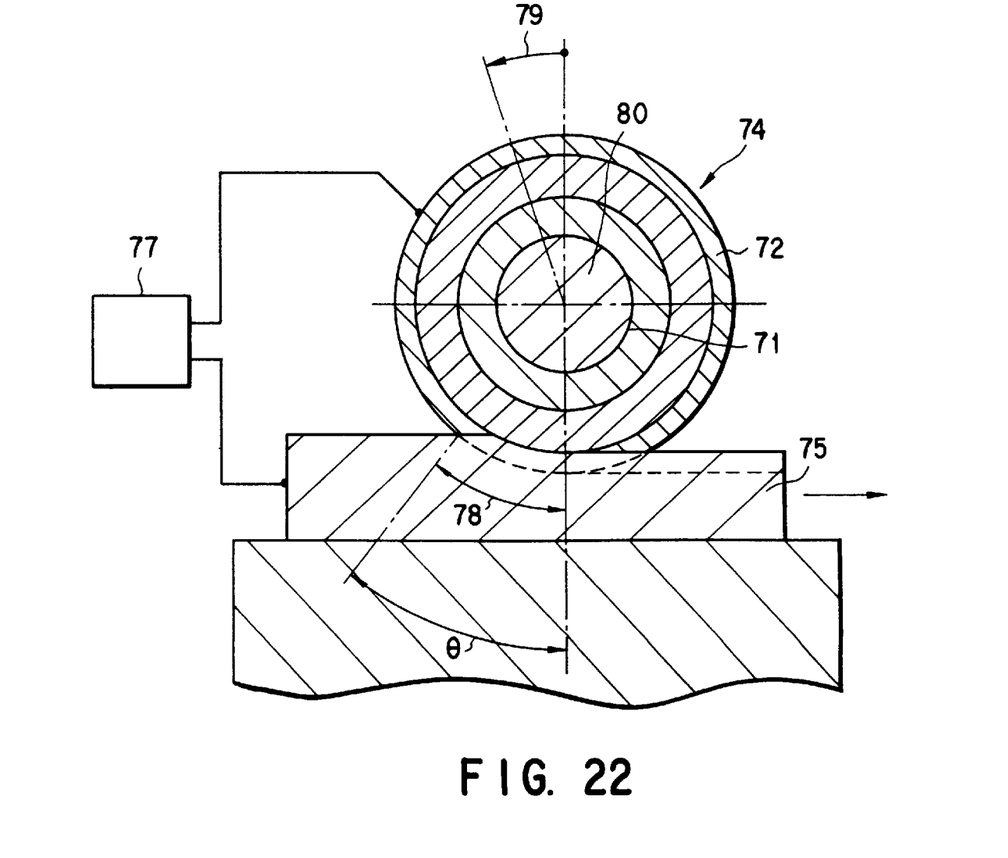
FIG. 22 is a view, showing a state in which an item is subjected to an electric spark machining employed in the method of the invention.

FIG. 22 shows a state in which the electrode 74 of FIG. 20 performs the electric spark machining. When a control unit 77 applies a voltage between the an item 75 to be machined and the electrode portion 72 while the electrode 74 is relatively moved on the item 75, a current flows therebetween, thereby performing an electric spark machining in a counter position 78 in which the electrode portion 72 faces to the item 75.

In FIG. 22, the item 75 is shifted from left to right. After the item 75 reaches its rightmost position, it is returned to its leftmost position. Subsequently, the electrode 74 is rotated in a direction indicated by arrow 79 about half the angle θ of the counter position 78. Then the portion of the electrode 74 which is not yet worn out faces to the counter position 78. Then, the item 75 is again moved from left to right in FIG. 22. After repeating these operations, the portions of the item 75 which correspond to the grooves 73 remain as projections having a configuration inverse to that of the grooves. Thus, a structure 81 with projections 82 arranged in a parallel stripe pattern is obtained as shown in FIG. 23.

Since in the above-described process, the portion of the electrode portion 72 which is used for electric spark machining is changed from one to another in an appropriate manner, fine projections 82 with a high precision in configuration are formed.

Since, in general, the electrode 74 and the item 75 are made of polycrystalline substances, the electric spark machining rate and the wear rate of the electrode depend upon the direction of the crystal axis of the electrode, and surface portions of the electrode have different discharge properties. Accordingly, where the item 75 is moved with the electrode 74 rotated, the surfaces of the item 75 and the electrode 74 will have fine irregularities, which disables forming of a smooth surface. To avoid this, it is preferable that, as described above, the electrode 74 is rotated through a predetermined angle after the item 75 has been once machined from one end to the other end, and is fixed again to repeat the treatment.

Figure 23:
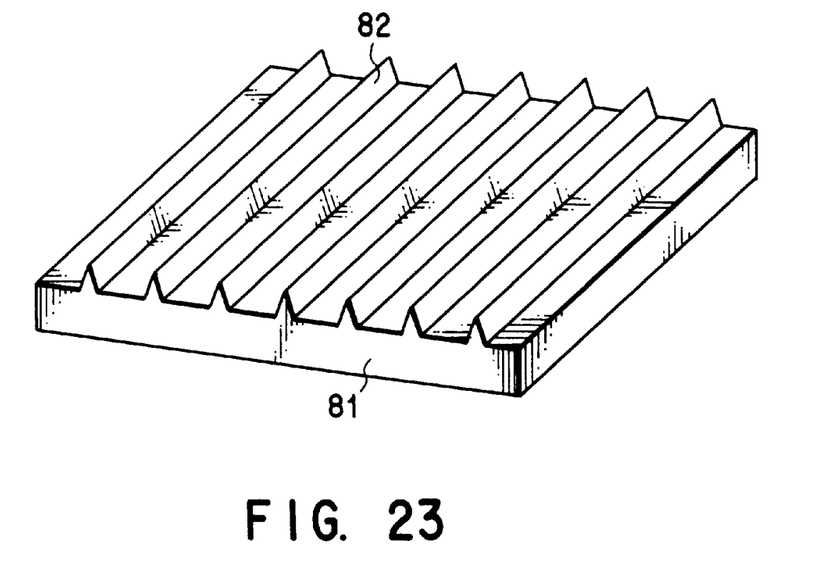
FIG. 23 is a view, showing an example of a structure formed by the method of the invention and having projections on its surface.
Figure 24:
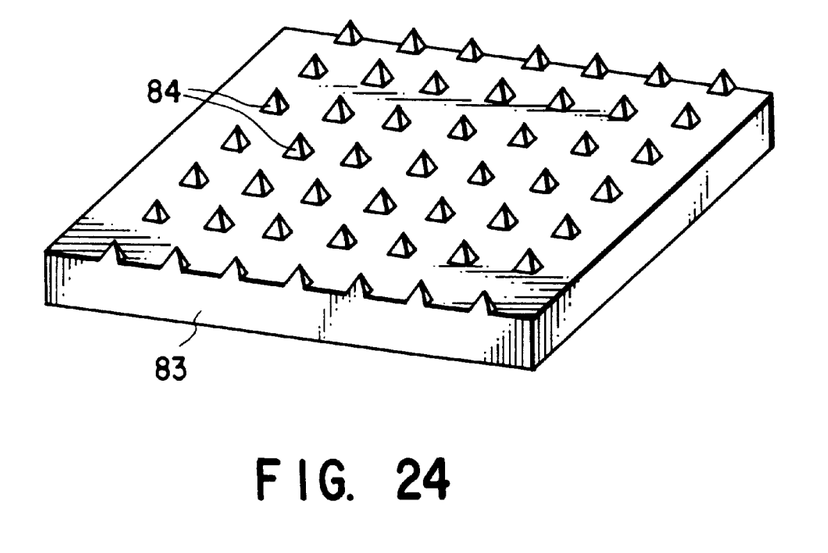
FIG. 24 is a view, showing another example of the structure formed by the method of the invention and having projections on its surface.

If the structure 81 of FIG. 23 in which linear projections 82 are arranged in parallel is subjected to another electric spark machining while the electrode 74 is relatively moved in a direction different from the direction in which the first time electric spark machining was performed, a structure 83 in which square pyramids 84 are arranged in a matrix as shown in FIG. 24 is obtained.

If a structure formed by a method other than the aforementioned one and having projections arranged in stripes or in a frame is subjected to an electric spark machining using the above method to remove part of the projections, a structure having projections arranged in a more complicated plan pattern can be obtained.

The structure shown in FIGS. 23 or 24 is used as a mold for forming rubber to be employed in a process for manufacturing the rear panel or front panel of a plasma display device, or used as a reactive electrode for a chemical device.

Unlike the conventional case of using a whetstone or a cutting tool, no physical force acts upon the projections in the method of the invention. Therefore, a structure which is provided with projections arranged in stripes and having a rectangular cross section (for example, a width of 50 μm and a height of 150 μm) can be processed with a high precision without deforming the projections.

(Seventh Embodiment)

The mold to be used in the method of the invention can be also manufactured by the following process:

An electroless deposition layer (e.g. a nickel layer) is deposited on a ceramic substrate (made of, for example, alumina-based ceramic). Then, the deposition layer is etched to form fine projections made of the deposition layer. The thus-obtained mold is used to form the composite sheet.

(Eighth Embodiment)

The composite sheet used in the method of the invention can be also manufactured by the following process:

The surface layer of the composite sheet is formed of a resin which contains dimethyl polycyclo hexane as a main component. The surface layer is radiated for 0.8 seconds with a 200 Hz KrF excimer laser (wavelength: 248 nm) at an energy density of 1 $J/cm^2$. As a result, grooves with a depth of 150 μm and a width of 50 μm are formed in the surface layer.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of manufacturing a structure having fine ribs, comprising:

(a) preparing a composite sheet which comprises an elastic surface layer and a base layer with a higher rigidity than the surface layer, the surface layer having grooves arranged in a two-dimensional pattern, a depth of the grooves being shallower than a thickness of the surface layer, the surface layer being made of rubber and having a thickness falling within a range of 0.3 mm to 1 mm and the base layer being formed of a metal sheet having a thickness falling within a range of 0.2 mm to 0.5 mm;

(b) filling the grooves of the surface layer with a paste material;

(c) curing the paste material to form ribs;

(d) laminating a substrate to the surface layer of the composite sheet, and pressing the composite sheet against the substrate from the base layer side by using a press roll, thereby compressing the ribs and adhering them to the substrate; and (e) removing the ribs and the substrate from the composite sheet.

2. The method according to claim 1, wherein the grooves each have a surface portion which is wider than a deeper portion thereof, a base portion of each rib which is adhered to the substrate being formed in the surface portion of each groove when the grooves are filled with the paste material.

3. The method according to claim 1, wherein the composite sheet is vibrated from the base layer side at the time of filling the grooves with the paste material, to accelerate the flow of the paste material into the grooves.

4. The method according to claim 1, wherein the paste material contains a solvent, and evaporation of the solvent is accelerated, at the time of curing the paste material, by reducing pressure around the surface layer and heating the surface layer.

5. The method according to claim 1, further comprising the step of coating the surface of the substrate or of the ribs with an adhesive before adhering the ribs to the substrate.

6. The method according to claim 1, further comprising the step of removing the ribs from the substrate after removing the ribs and the substrate from the composite sheet.

7. The method according to claim 1, wherein a structure, which comprises a plurality of layers laminated on one another and each including ribs, is formed by repeating the steps (a) through (e) of adhering the ribs on the substrate.

8. A method of manufacturing a structure having fine ribs, comprising:

(a) preparing a composite sheet which comprises an elastic surface layer and a base layer with a higher rigidity than the surface layer, the surface layer having grooves arranged in a two-dimensional pattern, a depth of the grooves being shallower than a thickness of the surface layer, the surface layer being made of rubber and having a thickness falling within a range of 0.3 mm to 1 mm and the base layer being formed of a metal sheet having a thickness falling within a range of 0.2 mm to 0.5 mm;

(b) filling the grooves of the surface layer with a paste material;

(c) curing the paste material to form ribs;

(d) laminating a substrate to the surface layer of the composite sheet;

(e) press rolling the base layer side of the composite sheet against the substrate by using a press roll, thereby compressing the ribs and adhering them to the substrate; and (f) removing the ribs and the substrate from the composite sheet.

9. A method of manufacturing a structure having fine ribs, comprising:

(a) preparing a composite sheet which comprises an elastic surface layer and a base layer with a higher rigidity than the surface layer, the surface layer having grooves arranged in a two-dimensional pattern, a depth of the grooves being shallower than a thickness of the surface layer;

(b) filling the grooves of the surface layer with a paste material;

(c) curing the paste material to form ribs;

(d) laminating a substrate to the surface layer of the composite sheet;

(e) press rolling the base layer side of the composite sheet against the substrate by using a press roll, thereby compressing the ribs and adhering them to the substrate; and (f) removing the ribs and the substrate from the composite sheet.

10. A method of manufacturing a plasma display panel including a rear panel or a front panel having fine ribs, comprising:

(a) preparing a composite sheet which comprises an elastic surface layer and a base layer with a higher rigidity than the surface layer, the surface layer having grooves arranged in a two-dimensional pattern, a depth of the grooves being shallower than a thickness of the surface layer, the surface layer being made of rubber and having a thickness falling within a range of 0.3 mm to 1 mm and the base layer being formed of a metal sheet having a thickness falling within a range of 0.2 mm to 0.5 mm;

(b) filling the grooves of the surface layer with a paste material;

(c) curing the paste material to form ribs;

(d) laminating a substrate to the surface layer of the composite sheet, and pressing the composite sheet against the substrate from the base layer side by using a press roll, thereby compressing the ribs and adhering them to the substrate; and (e) removing the ribs and the substrate from the composite sheet;

wherein the ribs have a width within the range of 20 $\mu$m to 100 $\mu$m, and a height within the range of 20 $\mu$m to 200 $\mu$m.

* * * * *